(12) United States Patent
Bélisle

(10) Patent No.: US 9,518,690 B2
(45) Date of Patent: Dec. 13, 2016

(54) FIRE HOSE GIRDLE

(71) Applicant: Dominique Bélisle, Gatineau (CA)

(72) Inventor: Dominique Bélisle, Gatineau (CA)

( * ) Notice: Subject to any disclaimer, the term of this patent is extended or adjusted under 35 U.S.C. 154(b) by 114 days.

(21) Appl. No.: 14/494,269

(22) Filed: Sep. 23, 2014

(65) Prior Publication Data
US 2016/0084423 A1   Mar. 24, 2016

(51) Int. Cl.
*F16L 57/02* (2006.01)
*F16L 35/00* (2006.01)
*A62C 33/04* (2006.01)

(52) U.S. Cl.
CPC .............. *F16L 35/00* (2013.01); *A62C 33/04* (2013.01)

(58) Field of Classification Search
CPC .......... F16L 35/00; F16L 57/00; F16L 57/005; F16L 57/02; F16L 57/06
USPC ............................... 285/45, 53, 15, 417, 419
See application file for complete search history.

(56) References Cited

U.S. PATENT DOCUMENTS

| | | | | |
|---|---|---|---|---|
| 3,344,393 A * | 9/1967 | Hendee | ............ | H01R 13/6392 439/367 |
| 4,643,505 A * | 2/1987 | House | ............ | H01R 13/6392 174/92 |
| 4,741,559 A * | 5/1988 | Berghman | ............ | F16L 35/00 285/419 |
| 5,853,200 A * | 12/1998 | Zieres | ............ | F16L 35/00 285/419 |
| 5,895,076 A * | 4/1999 | Elliott | ............ | F16L 35/00 285/14 |
| 6,454,576 B1 * | 9/2002 | Hedrick | ............ | H01R 13/5812 439/105 |
| 6,766,761 B1 * | 7/2004 | Tamez, Jr. | ............ | A62B 3/00 116/205 |
| 7,938,457 B2 * | 5/2011 | Weinhandl | ............ | F16L 33/2073 285/373 |
| 7,942,544 B2 * | 5/2011 | Smathers | ............ | F21V 33/0076 340/626 |

* cited by examiner

*Primary Examiner* — Rodney Mintz
*Assistant Examiner* — Daniel Kenny
(74) *Attorney, Agent, or Firm* — Garrett James O'Sullivan; Timothy Marc Shropshire; Eric Brandon Lovell

(57) ABSTRACT

A girdle for a hose coupling has two halves. Each half has a rounded outer surface and a hollow cylindrical center portion configured to house a hose coupling. The center portion of the girdle has stepped shoulders on each end that engage with the hose coupling to maintain the position of the girdle over the hose coupling. The two halves of the girdle are joined around the hose coupling by one or more fasteners to form a prolate spheroid.

13 Claims, 14 Drawing Sheets

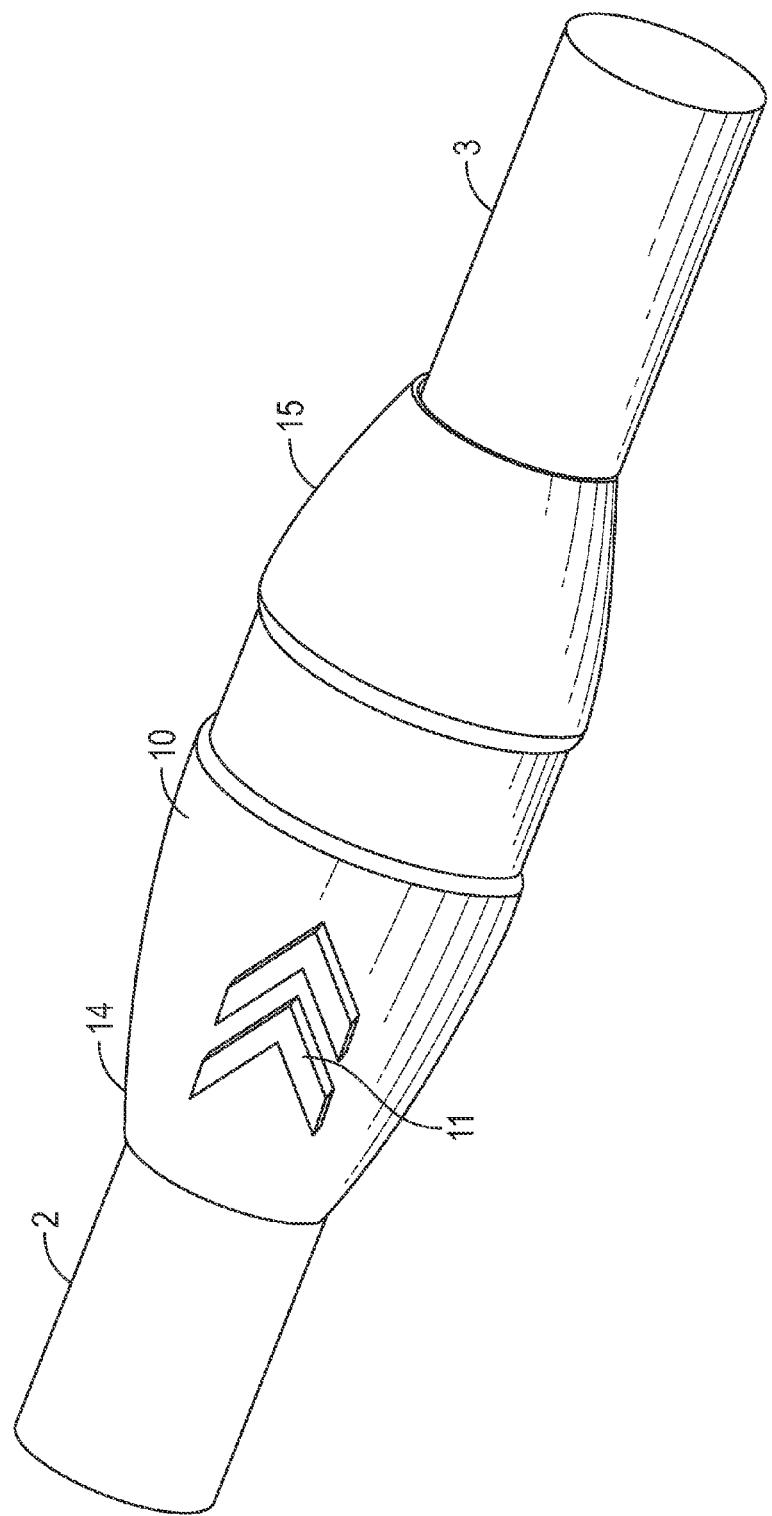

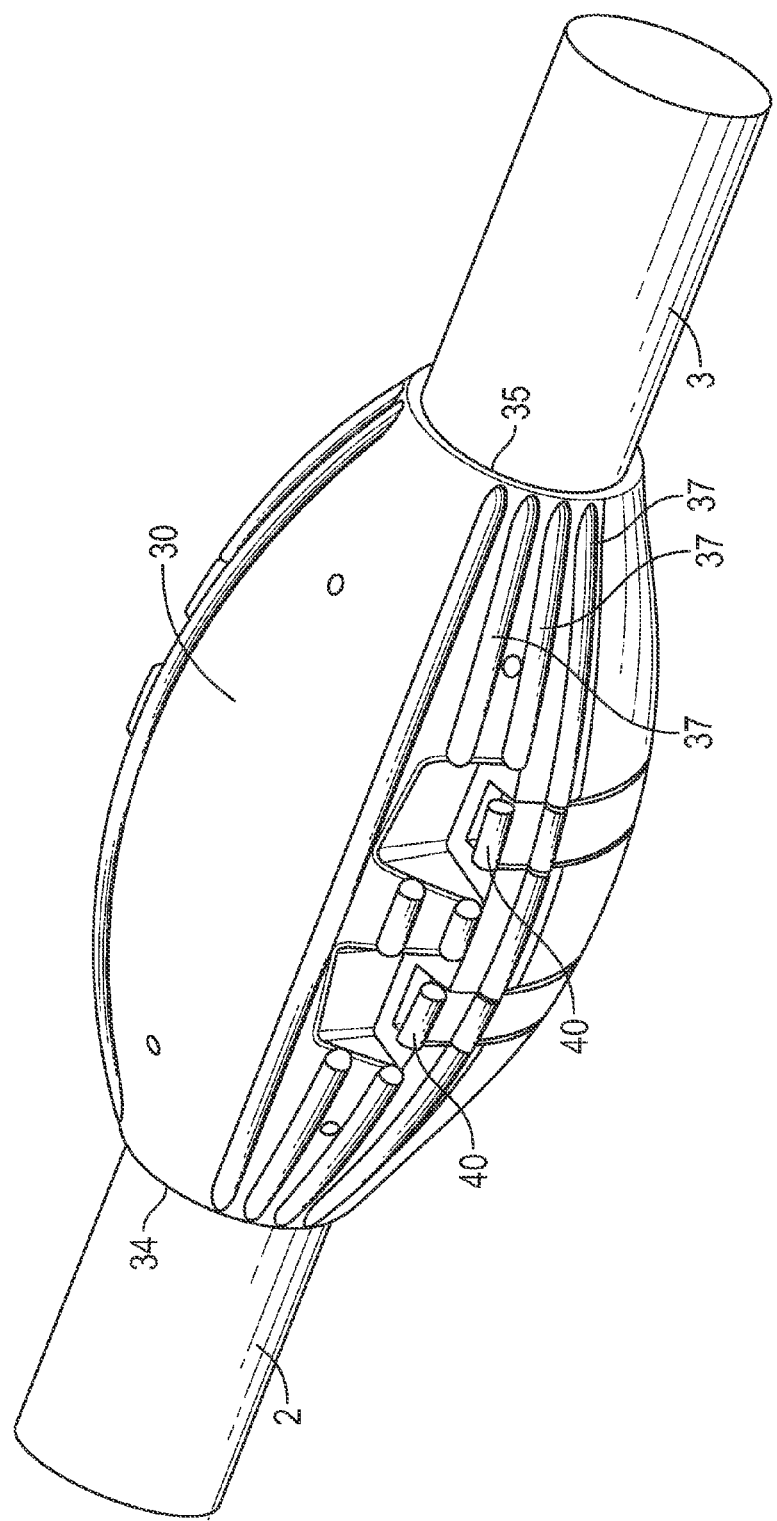

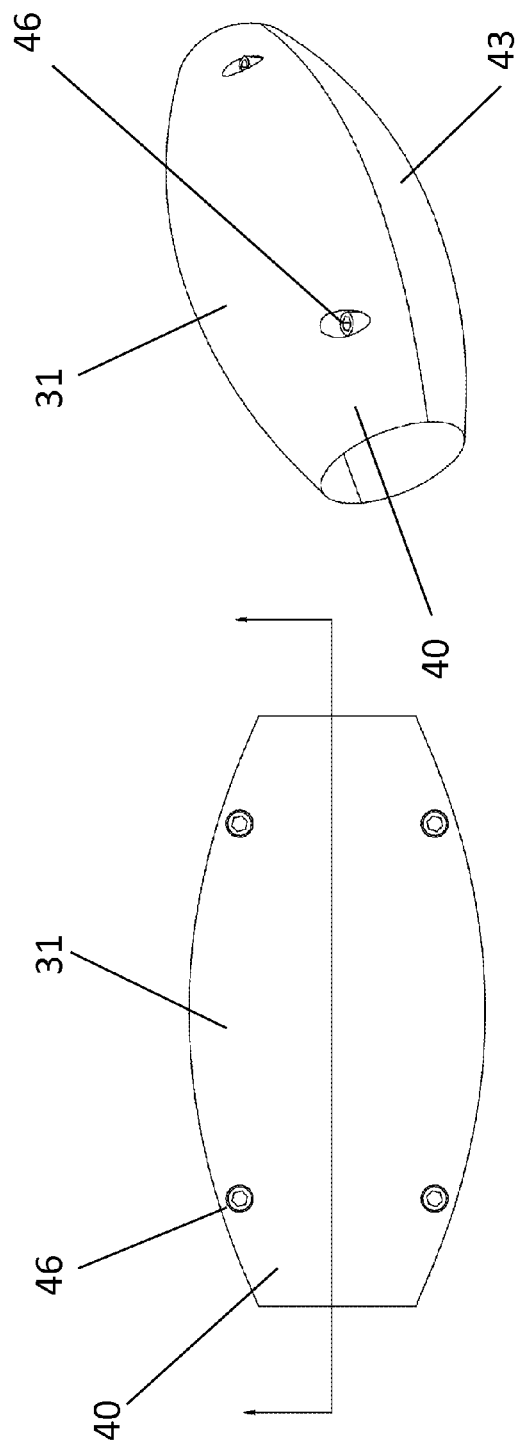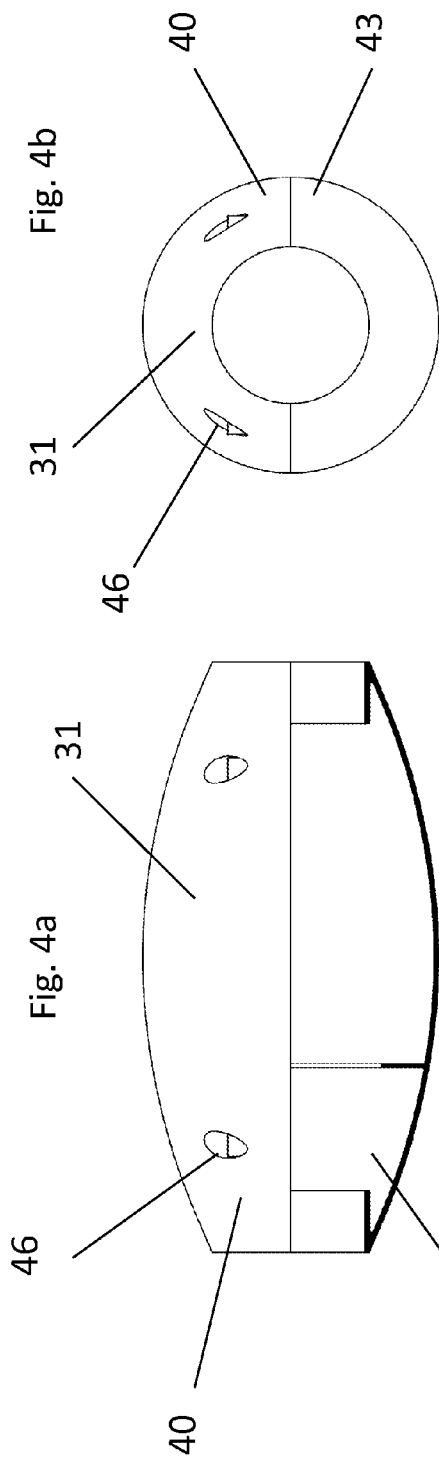

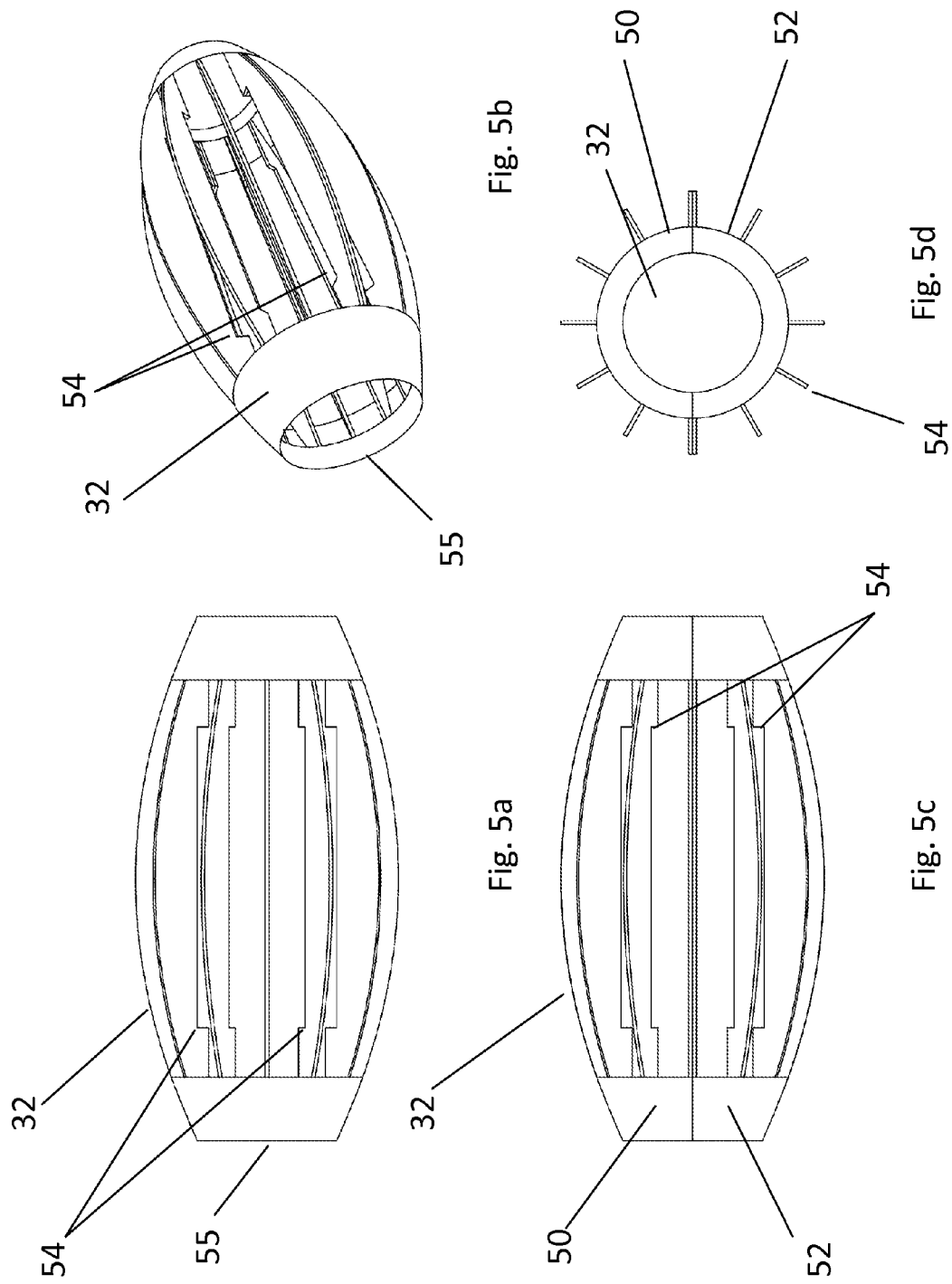

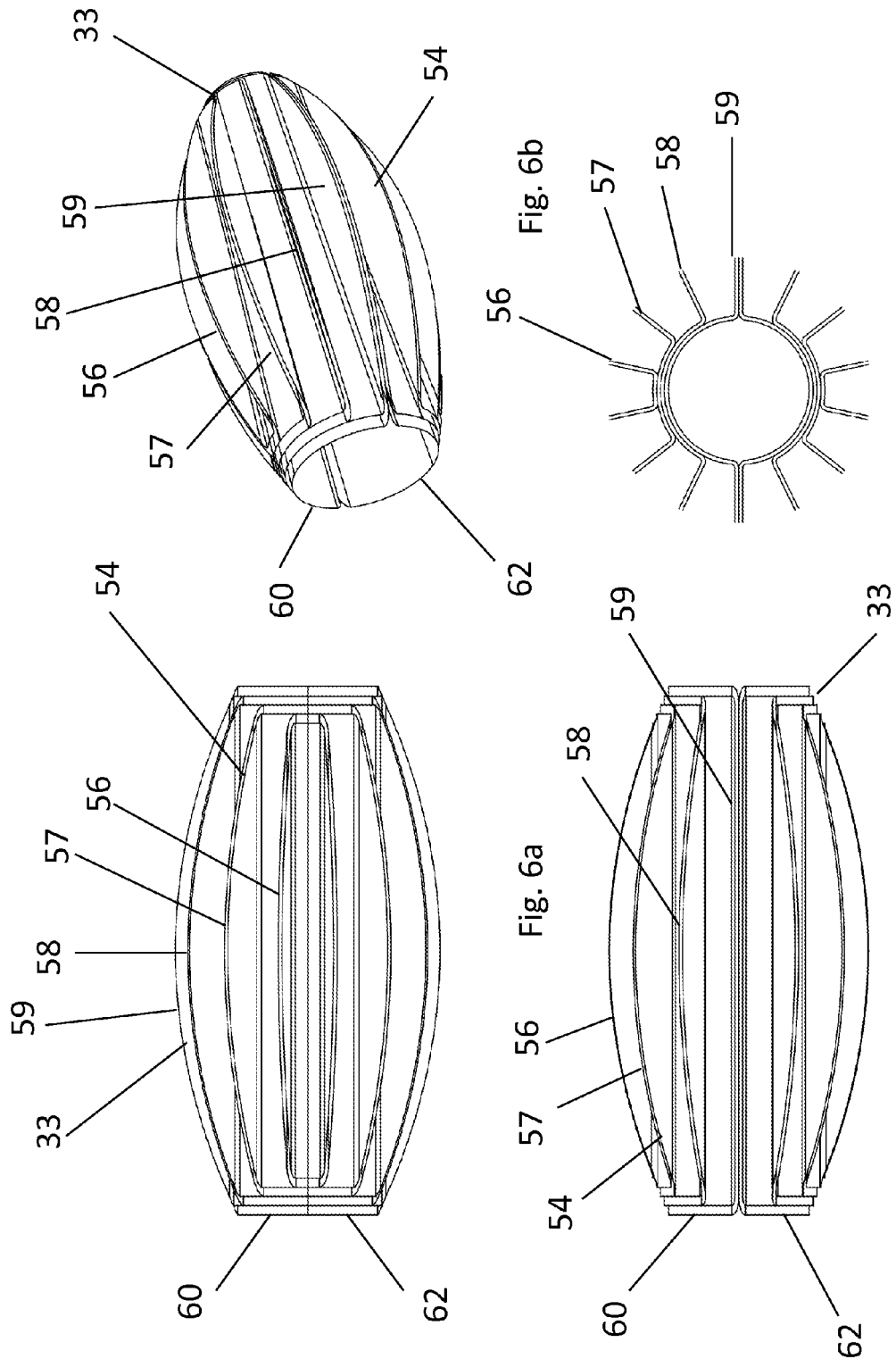

FIRE HOSE GIRDLE

FIELD OF THE INVENTION

The present invention relates to improving the deployment of fire hose sections, and particularly prevention of catching the hose coupling on obstacles such as stairs and doorways.

BACKGROUND OF THE INVENTION

Couplings are used by fire department services to attach different segments of a fire hose, and are necessary to provide flexibility in hose lengths and ease of replacing a worn or punctured segment. Hoses are typically 1¾" in outside diameter ("hose diameter") with the coupling having an outside diameter of 2¼" ("coupling diameter"), but may vary from a 1" to 2½" hose diameter with a coupling diameter of up to 4". Oftentimes, couplings on multi-segment fire hoses cause problems of maneuverability by catching on doors, stairs and other protrusions as firemen drag the fire hose behind them. When this occurs, one of the two-person team must leave his/her co-worker alone and exposed to danger in order to free the hose. If a firefighter is alone, the catching of a hose may result in an extremely dangerous situation, including the loss of life and/or an end to forward progress unless the firefighter can backtrack to timely release the caught coupling. This disengagement intervention is counterproductive and bears a high safety risk for the fireman left alone operating the water hose on the fire site, while his/her co-worker leaves to solve the problem.

Typically, four water lines are connected to the fire truck. The material of all segments of fire hoses are white or silver with no indication as to the source of the particular hose on the fire site. Furthermore, the fire hose does not typically provide a readily and easily discernible indication as to the location of the building's exit, which can be extremely dangerous for a fireman who is disoriented within a burning building, trying to find his or her way out by following the hose.

SUMMARY

A girdle for a hose coupling has two halves. Each half comprises a rounded outer surface and a hollow cylindrical center portion configured to house a hose coupling, wherein the center portion has stepped shoulders on each end. The stepped shoulders of the center portion engage with the hose coupling to maintain the position of the girdle over the hose coupling. The two halves of the girdle are joined around the hose coupling by one or more fasteners to form a prolate spheroid. In one embodiment, the girdle has a flush fitment with the hose when assembled around the hose coupling.

In one embodiment, each half of the girdle is identical. In another embodiment, each half of the girdle has ribs configured to provide grip, wherein the ribs are protruding from the outer surface of the girdle. In yet another embodiment, the girdle may have an exit indicator configured to assist in locating a building's exit.

In one embodiment, the girdle has drainage apertures configured to allow water to drain from the girdle. In another embodiment, the shoulders coincide with the commencement of tapering at each end of the girdle.

In one embodiment, each half of the girdle comprises one or more alignment pegs and one or more apertures, wherein the apertures are configured to accommodate a corresponding alignment peg. In another embodiment, each half comprises one or more apertures configured to accommodate a fastener. In this embodiment, the girdle further comprises one or more fasteners configured to pass through the apertures and fasten the halves of the girdle together around the coupling.

In one embodiment, the girdle has a circumferential groove within the hollow cylindrical center portion configured to accommodate a valve ring and gripping protrusions located on the hose coupling. In another embodiment, the girdle has one or more fins, wherein the fins protrude outwardly from the outer surface of the girdle and are configured to guide the girdle over obstacles. Furthermore, sets of paired fins may be affixed to outer surface of the girdle, wherein the fins protrude outwardly from the outer surface of the girdle. In yet another embodiment, the two halves of the girdle are hinged on one side and are secured together by a fastener on the opposite side, wherein the fastener is configured to engage with a lip on the opposite half to secure the two halves of the girdle to one another.

DESCRIPTION OF FIGURES

FIG. 2a shows the outer view of a girdle mounted on a hose coupling, according to an embodiment of the present invention.

FIG. 3a shows an exterior view of the girdle with ribs and fasteners, according to an embodiment of the present invention.

FIG. 4a shows an exterior overhead view of the upper half of the girdle with apertures, according to an embodiment of the present invention.

FIG. 4b shows an exterior 3-dimensional perspective of the girdle with apertures, according to an embodiment of the present invention.

FIG. 4c shows a side view of the girdle with apertures, according to an embodiment of the present invention.

FIG. 4d shows an end view of the girdle with apertures, according to an embodiment of the present invention.

FIG. 5a shows an exterior overhead view of the upper half of the girdle with fins, according to an embodiment of the present invention.

FIG. 5b shows an exterior 3-dimensional perspective of the girdle with fins, according to an embodiment of the present invention.

FIG. 5c shows a side view of the girdle with fins, according to an embodiment of the present invention.

FIG. 5d shows an end view of the girdle with fins, according to an embodiment of the present invention.

FIG. 6a shows an exterior overhead view of the upper half of the girdle with sets of paired fins, according to an embodiment of the present invention.

FIG. 6b shows an exterior 3-dimensional perspective of the girdle with sets of paired fins, according to an embodiment of the present invention.

FIG. 6c shows a side view of the girdle with sets of paired fins, according to an embodiment of the present invention.

FIG. 6d shows an end view of the girdle with sets of paired fins, according to an embodiment of the present invention.

DETAILED DESCRIPTION OF THE INVENTION

The present invention relates to a fire hose girdle for positioning over a hose coupling to protect the coupling, while preventing the coupling from protruding and catching on objects, as well as providing an easily discernible indicator for firemen to utilize when disoriented in a burning building.

Figure 1:
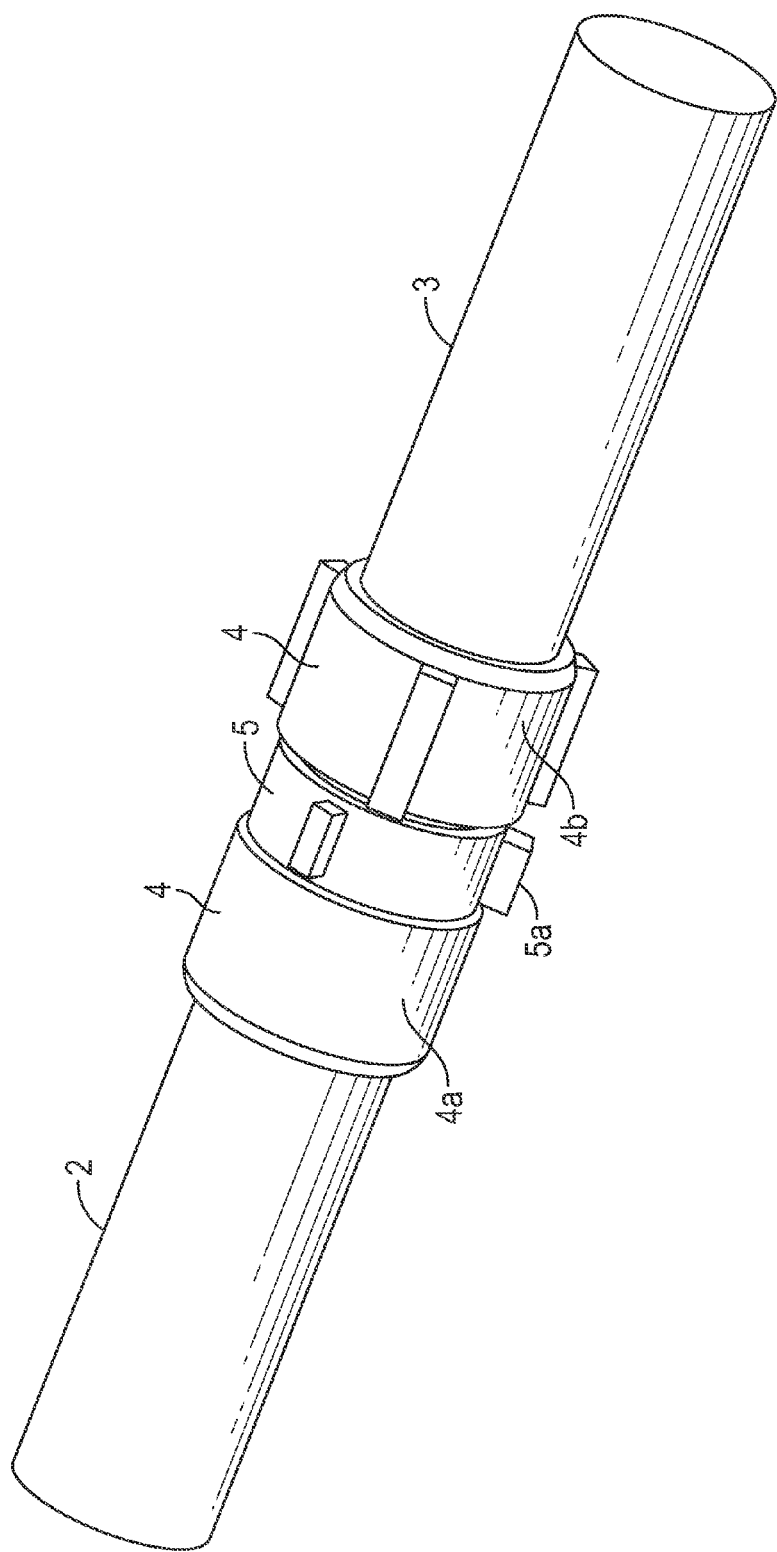
FIG. 1 (prior art) shows a hose coupling known in the art.

With reference to FIG. 1, a hose coupling known in the art is shown. There are two hose terminals 2, 3 of separate hoses joined by a hose coupling 4 made up of male 4a and female 4b mating portions. Generally, the male 4a and female 4b mating portions of the hose coupling 4 have corresponding threading to allow them to be screwed together to sealingly connect the hose terminals 2, 3. Alternatively, the hose coupling 4 may be configured with a valve ring 5 that is closed by a quarter turn to sealingly connect the hose terminals 2, 3. Typically, the valve ring 5 has gripping protrusions 5a for ease of gripping the valve ring 5 with gloves. Alternatively, the valve ring 5 may be configured to be opened by a wrench.

With reference to FIGS. 1 and 2a, a girdle 10 is shown mounted around the hose coupling 4 (not shown). The girdle 10 has a generally hollow cylindrical center portion 12 (not shown) that tapers at the ends 14, 15 to form a flush engagement with the hose terminals 2, 3, respectively. The center portion 12 (not shown) is for containing the hose coupling 4 therein. The girdle 10 has an exit indicator 11 that is positioned on the end of the girdle that corresponds with the male mating portion 4a of the hose coupling 4. It is necessary that the exit indicator be positioned in this orientation, because the male mating portion 4a of the hose coupling 4 provides a directional indicator of an exit from the building. This is because the portion protruding from the fire truck is male, and each hose extension has a female portion that mates to the end facing the fire truck extension, and terminates in a male portion. The exit indicator 11 indicates the direction of the exit visually, in the form of an arrow or similar marking, and tactilely in the form of an indent or raised portion that can be felt by a fireman in the event that he/she is disoriented and/or is unable to see, to indicate the direction of the exit following the hose. As the hose coupling 4 may leak, in an embodiment the girdle 10 has drainage apertures (not shown) for draining water from the girdle 10.

Figure 2B:
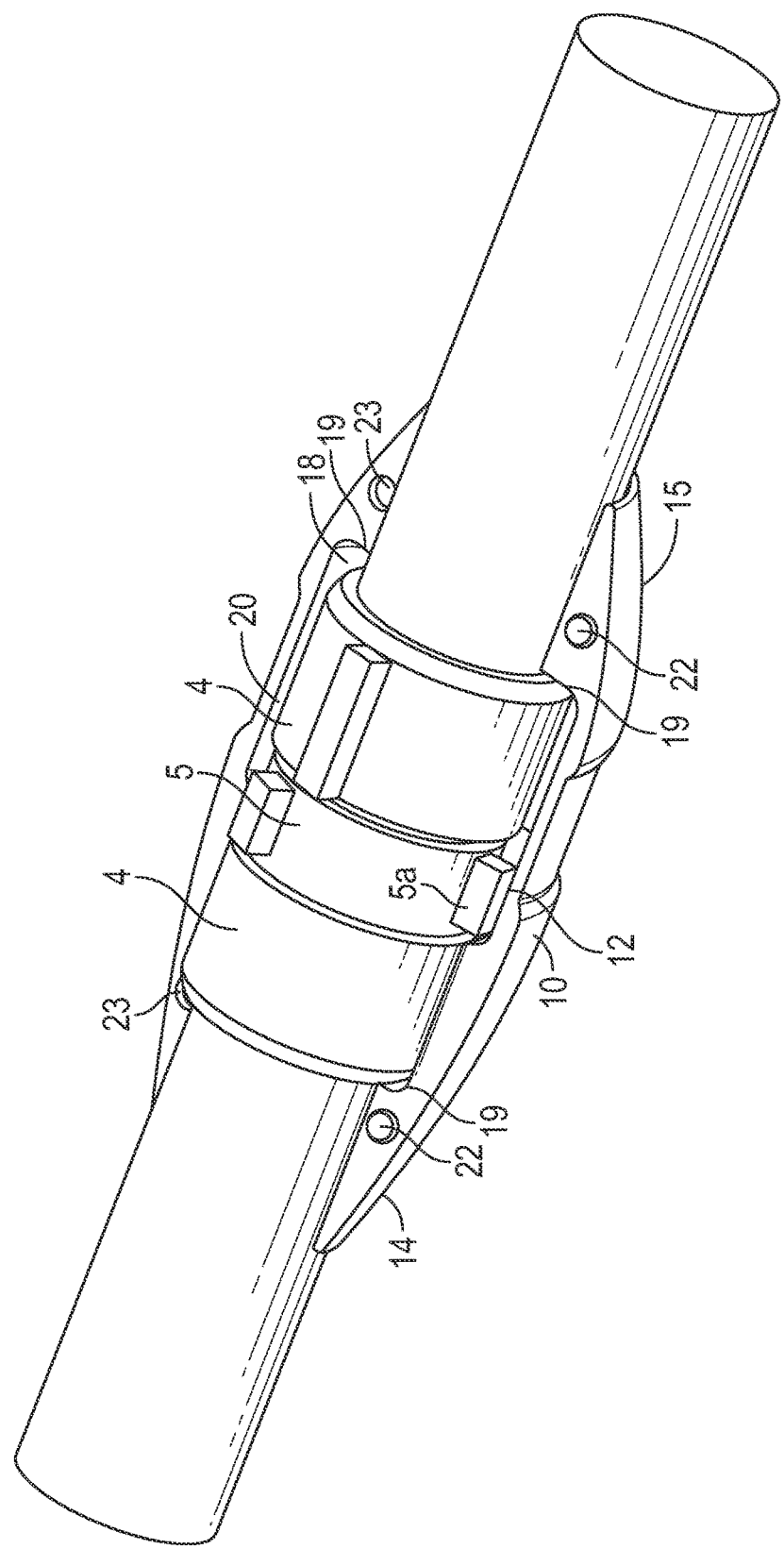
FIG. 2b shows one half of the girdle mounted on a hose coupling, according to an embodiment of the present invention.

With reference to FIG. 2b, one half of the girdle is shown. The girdle 10 is hollow and accommodates the hose coupling 4 therein. The inner wall 18 of the center portion 12 of the girdle 10 has stepped shoulders 19 on opposite sides to maintain position over the hose coupling 4 such that a force on one side or another does not dislodge the girdle 10. In one embodiment, the shoulders 19 coincide with the commencement of the tapering of the ends 14, 15. The inner wall 18 also has a circumferential groove 20 therein to accommodate the valve ring 5 and gripping protrusions 5a.

In an embodiment, the girdle 10 consists of two identical halves that are mated around the hose. Each half has alignment pegs 22 and apertures 23 for accommodating the alignment pegs 22. Each half also has a fastener 25 such as a clip, latch or clasp for engaging with the other half to hold the halves together around the hose coupling 4. The halves combine to form a prolate spheroid (football shape) around the coupling 4 (not shown).

With reference to FIG. 3a, the girdle 30 is a prolate spheroid shape, having openings at each end 34, 35 to accommodate hose terminals 2, 3. The girdle 30 has ribs 37 to provide grip, and a fastener 40 such as a clip, latch or clasp on each side for fastening the halves together.

Figure 3B:
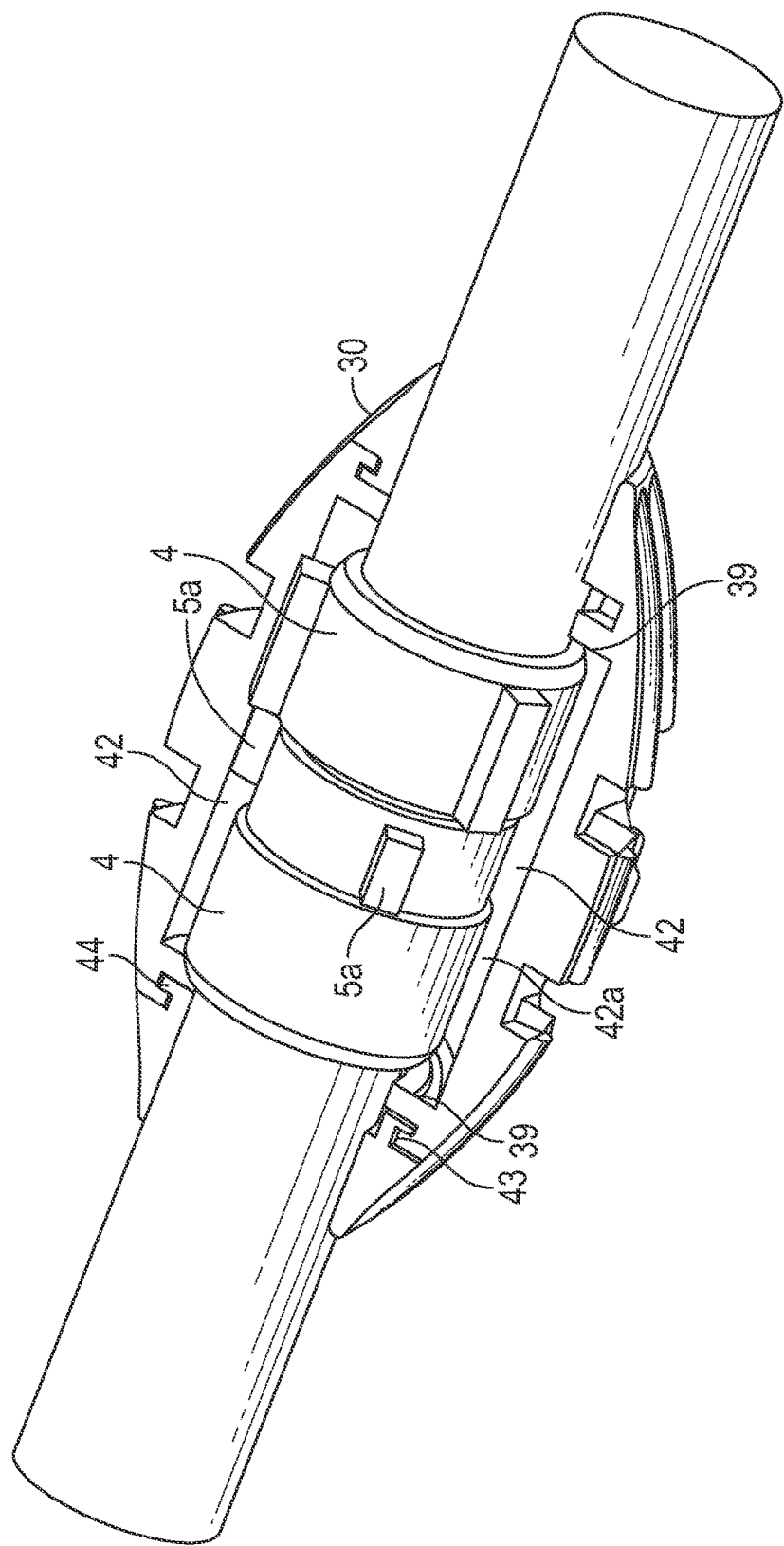
FIG. 3b shows one half of the girdle mounted on a hose coupling, according to an embodiment of the present invention.
Figure 7A:
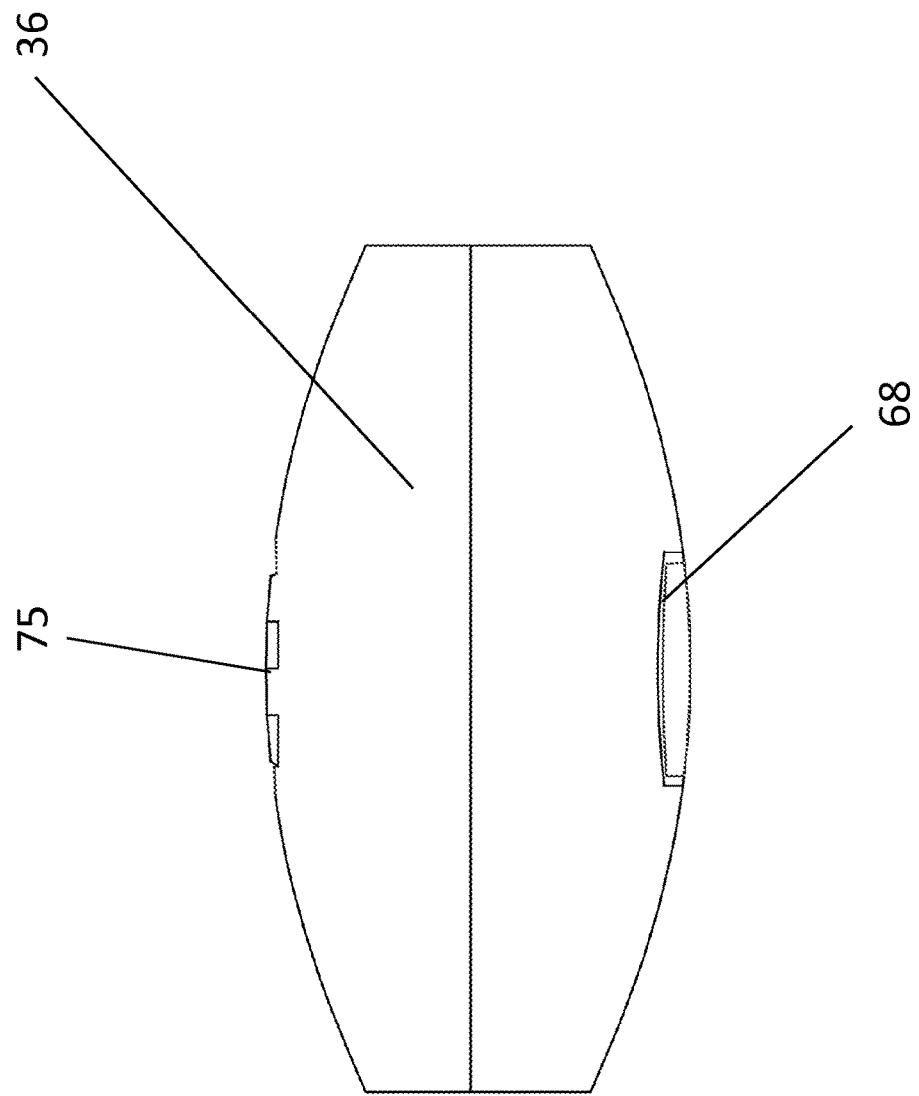
FIG. 7a shows an exterior overhead view of the upper half of the girdle with a hinge on one side and a fastener on the opposite side, according to an embodiment of the present invention.
Figure 7B:
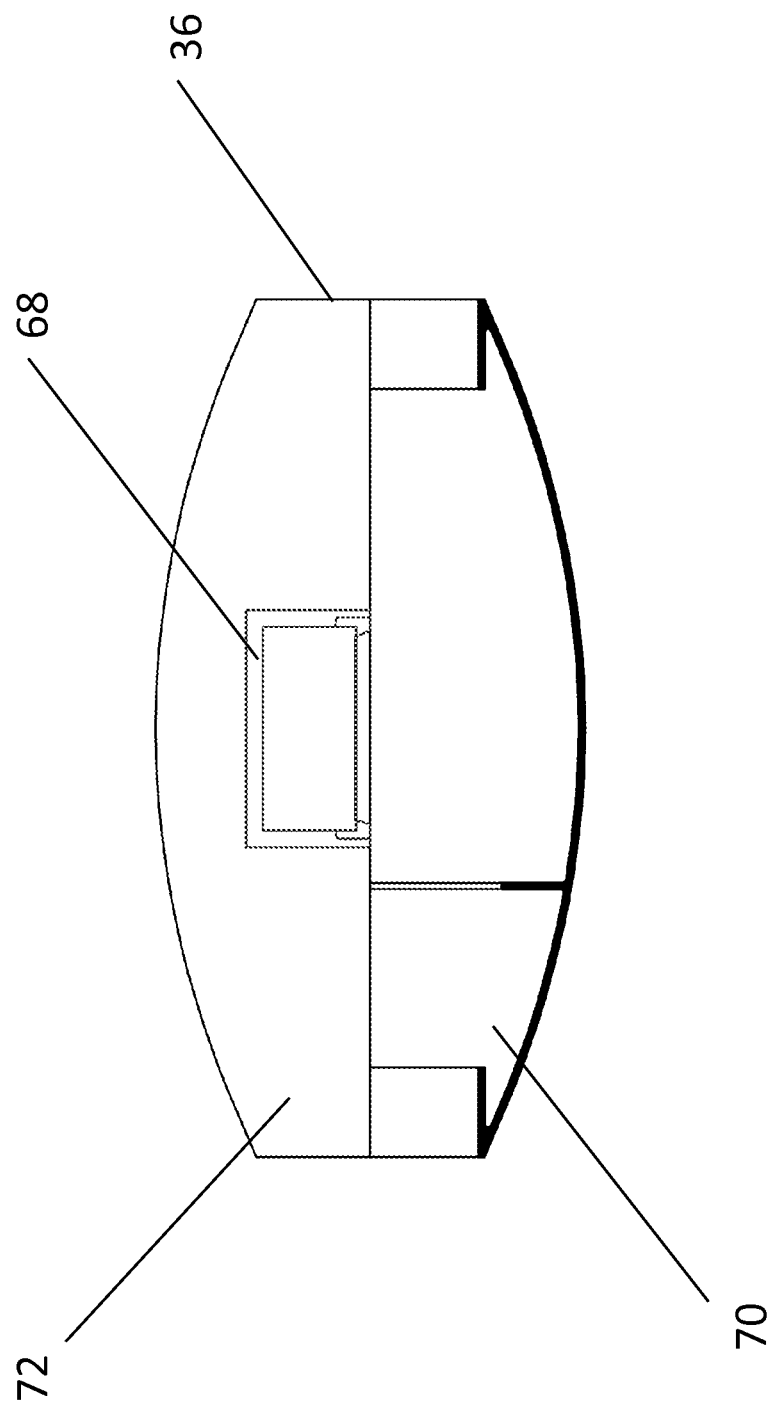
FIG. 7b shows an exterior side view of the fastener side of the girdle, according to an embodiment of the present invention.
Figure 7C:
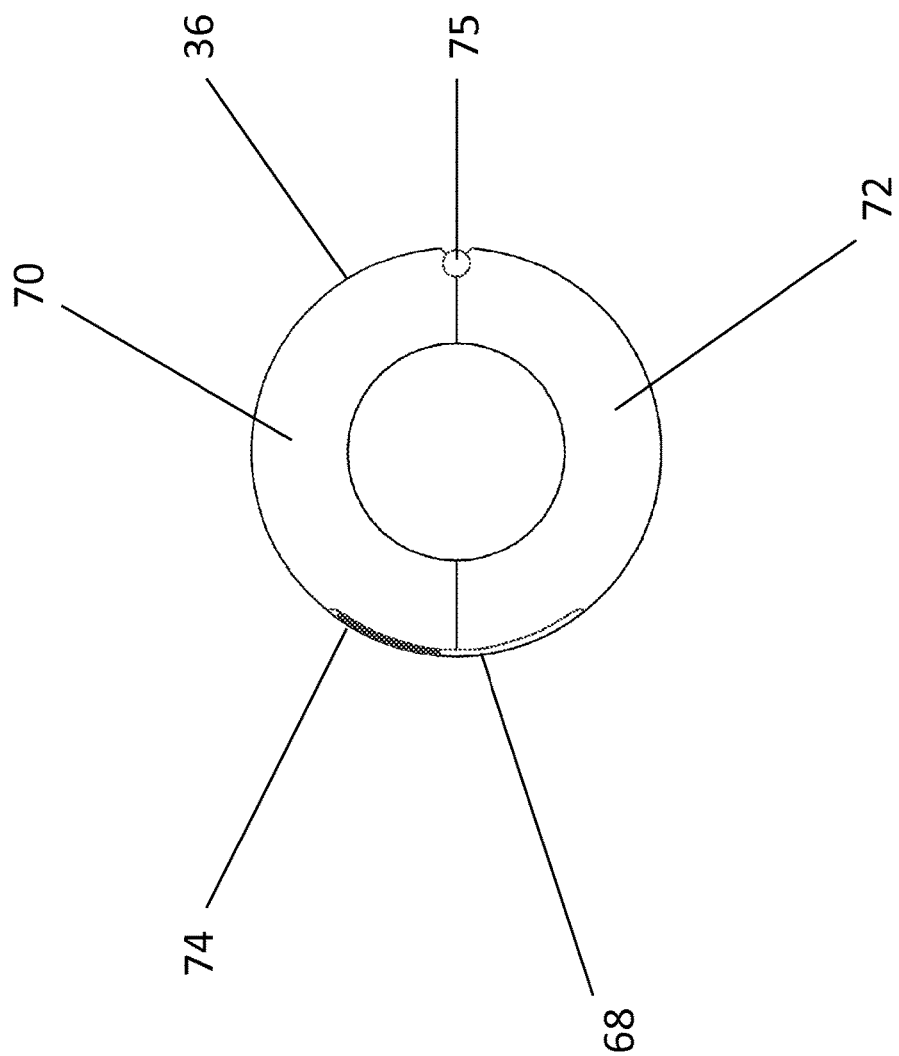
FIG. 7c shows an end view of the girdle, hinged on one side and fastened together on the opposite side, according to an embodiment of the present invention.
Figure 7D:
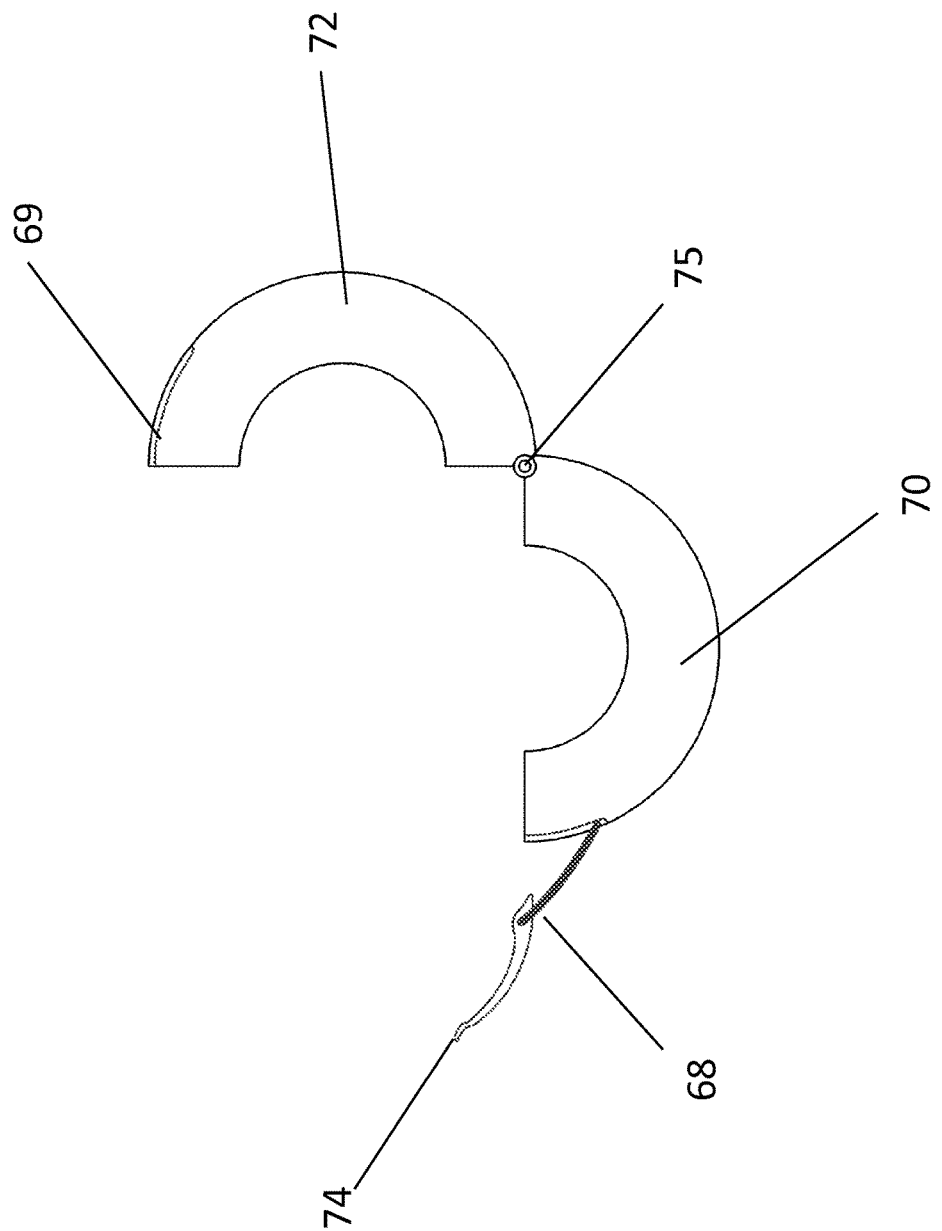
FIG. 7d shows an end view of the girdle, hinged and unfastened/open, according to an embodiment of the present invention.
Figure 7E:
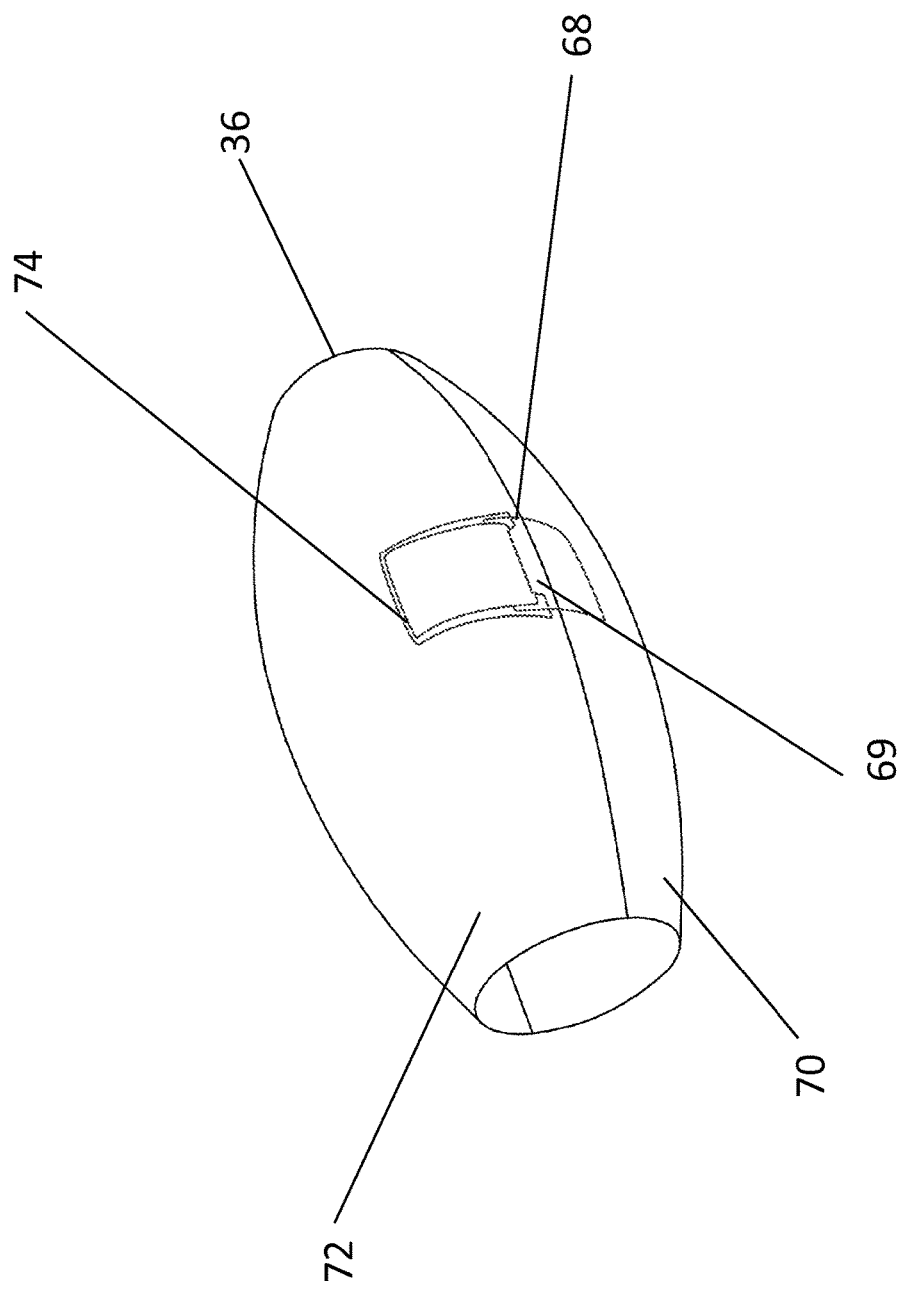
FIG. 7e shows an exterior 3-dimensional view of the fastener side of the girdle, according to an embodiment of the present invention.
Figure 7F:
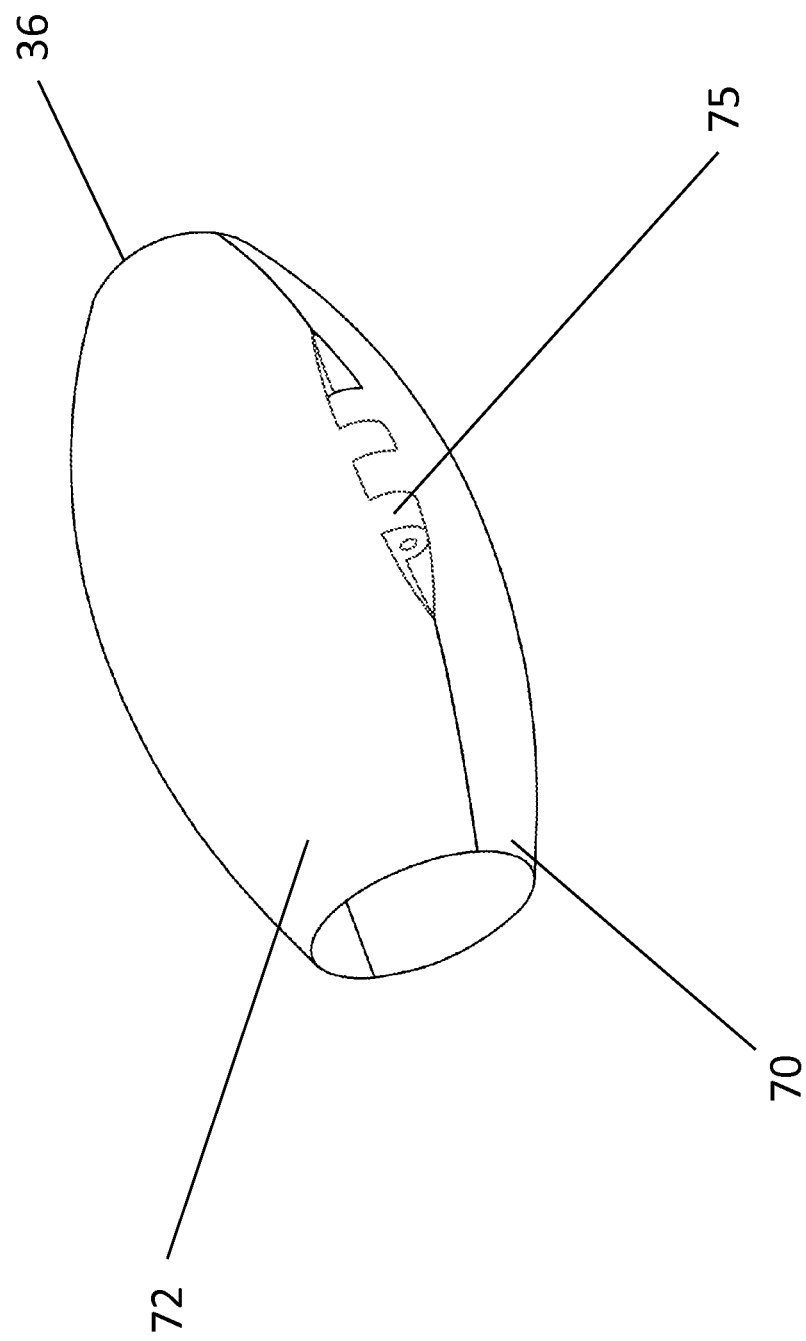
FIG. 7f shows an exterior 3-dimensional view of the hinge side of the girdle, according to an embodiment of the present invention.

With reference to FIG. 3b, the interior of the girdle 30 accommodates the hose coupling 4. An inner wall 42a has a circumferential groove 42 therein for accommodating the hose coupling 4 and valve ring gripping protrusions 5a. Further, the inner wall 42a has shoulders 39 to engage with the edges of the hose coupling 4 and prevent movement of the girdle 30 off the hose coupling 4.

In an embodiment, the girdle 30 consists of two identical halves that are mated around the hose. Each half has alignment pegs 43 and apertures 44 for accommodating the alignment pegs 43. Each half also has a fastener 40 such as a clip, latch or clasp for engaging with the other half to hold the halves together around the hose coupling 4. In another embodiment, that halves are not identical.

With reference to FIGS. 4a-d, one embodiment of a girdle 31 is shown, having an upper half 40 and a lower half 43. The upper half 40 has apertures 46 therein for fasteners (not shown), such as screws, bolts or pins which enter into corresponding apertures (not shown) on the lower half 43. The apertures 46 are counter-sunk so the fastener head (not shown) does not protrude when holding the halves 40, 43 together around the hose coupling 4 (not shown).

With reference to FIGS. 5a-d, another embodiment of the girdle 32 is shown, wherein the girdle 32 is composed of two halves 50, 52. Each half 50, 52 has a number of fins 54 protruding outwardly therefrom for engaging with obstacles and guiding the girdle 32 over the obstacles. The girdle 32 has smooth ends 55 where the ends of the girdle 32 connect with the hose (not shown).

In another embodiment shown in FIGS. 6a-d, the girdle 33 comprises two halves 60, 62 which encompass the hose coupling 4. The fins 54 are positioned around the girdle 33 in pairs 56, 57, 58, 59, wherein the inner pair 56 is positioned on the next innermost pair 57, which is positioned on the next innermost pair 58, which is positioned on the outermost pair 59 on each half. The pairs 56-59 are adhered together, and engage with obstacles and guide the girdle 33 over or around them, such that the girdle 33 does not catch on the obstacles.

In another embodiment shown in FIGS. 7a-f, the girdle 36 is formed of a first half 70 and a second half 72, and is connected on one side by a hinge 75 where the halves 70, 72 meet. On the opposite side of the girdle 36 is a fastener 68 such as a latch or clasp that holds the halves 70, 72 together around the coupling 4 (not shown). The fastener 68 is hinged to the first half 70 and engages against a lip 69 on the second half 72. When the fastener 68 is pushed in so as to be flush with the surface of the girdle 36, the fastener 68 applies pressure to push halves 70, 72 together. A fastener handle 74 can be pulled to release the engagement of the fastener 68 with the lip 69, releasing the halves 70, 72.

In use, firstly, the lower section of a fire hose girdle, colored white, blue, yellow or red depending on the white, blue, yellow or red color of the fire hose line, is slid under the fire hose to secure the existing couplings or attachments of the fire hose within the lower section of the stepped shoulders in the proper position of the direction of the arrow indicating the exit to the fire truck.

Secondly, the upper male portion of the girdle is snapped over the lower female portion of the device in the proper position of the direction arrow indicating the exit to the fire truck.

Accordingly, once properly in place, the invention further protects the hose coupling 4 and is intended as a rapid eyesight identification of the fire hose color lines and the exit direction to the fire truck for the operators.

The invention is applicable to all types of coupling, including couplings for water hoses and lines, oil hoses and lines, and lines for compressed air.

I claim:

1. A girdle for a hose coupling comprising:
   a. a first half comprising a fastener;
   b. a second half having a lip protruding therefrom, wherein the first half and the second half are hingedly connected to one another, wherein the fastener engages the lip to releasably close the first half and the second half around the hose coupling, and wherein the first half and the second half each comprise:
      i. a rounded outer surface;
      ii. a hollow cylindrical center portion for housing the hose coupling, the center portion having a plurality of stepped shoulders on each end, wherein at least one of the stepped shoulders matingly engage ends of the hose coupling to maintain the position of the girdle over the hose coupling,
   wherein, in a closed position, the first half and the second half form a prolate spheroid.

2. The girdle of claim 1, wherein the girdle has a flush fitment with a hose.

3. The girdle of claim 2 further comprising drainage apertures extending through the first half and the second half to allow water to drain from the center portion of the girdle.

4. The girdle of claim 3, wherein at least one of the plurality of stepped shoulders is a circumferential groove within the hollow cylindrical center portion, wherein the circumferential groove accommodates a valve ring and gripping protrusions of the hose coupling.

5. The girdle of claim 1, wherein the rounded outer surface of the first half and the second half is a plurality of fins, wherein the plurality of fins protrude outwardly from the rounded outer surface of the girdle and are configured to guide the girdle over obstacles.

6. The girdle of claim 5, wherein the rounded outer surface is open to the interior of the girdle in-between each of the plurality of fins.

7. The girdle of claim 1 wherein each half has ribs configured to provide grip, wherein the ribs are protruding from the outer surface of the girdle.

8. The girdle of claim 1, further comprising an exit indicator integrated into an exterior surface of the girdle, wherein the exit indicator indicates a direction to a building's exit.

9. The girdle of claim 1, each half further comprising:
   a. one or more alignment pegs; and
   b. one or more apertures each configured to accommodate an alignment peg.

10. The girdle of claim 1 each half further comprising one or more apertures configured to accommodate a fastener; and wherein the girdle further comprises one or more fasteners configured to pass through the apertures and fasten the halves of the girdle together around the coupling.

11. The girdle of claim 1 further comprising one or more sets of paired fins affixed to the outer surface of the girdle, wherein the fins are outwardly protruding from the outer surface of the girdle.

12. A girdle for a hose coupling comprising:
   a. a first half comprising a fastener;
   b. a second half having a lip protruding therefrom, wherein the first half and the second half are hingedly connected to one another, wherein the fastener engages the lip to releasably close the first half and the second half around the hose coupling, and wherein the first half and the second half each comprise:
      i. a rounded outer surface comprising a plurality of fins extending outward from the rounded outer surface;
      ii. a hollow cylindrical center portion for housing the hose coupling, the hose coupling having a valve ring with one or more gripping protrusions extending outward from the valve ring, the center portion having a plurality of stepped shoulders on each end, wherein at least one of the stepped shoulders matingly engage ends of the hose coupling to maintain the position of the girdle over the hose coupling, and wherein another of the stepped shoulders accommodates the valve ring, wherein the valve ring has a larger circumference than the ends of the hose coupling; and
      iii. an exit indicator integrated the outer surface, wherein the exit indicator indicates a direction to a building's exit.

13. The girdle of claim 12, wherein the rounded outer surface of the first half and the second half is a plurality of fins, wherein the plurality of fins protrude outwardly from the rounded outer surface of the girdle and are configured to guide the girdle over obstacles.

* * * * *